United States Patent Office 3,642,844
Patented Feb. 15, 1972

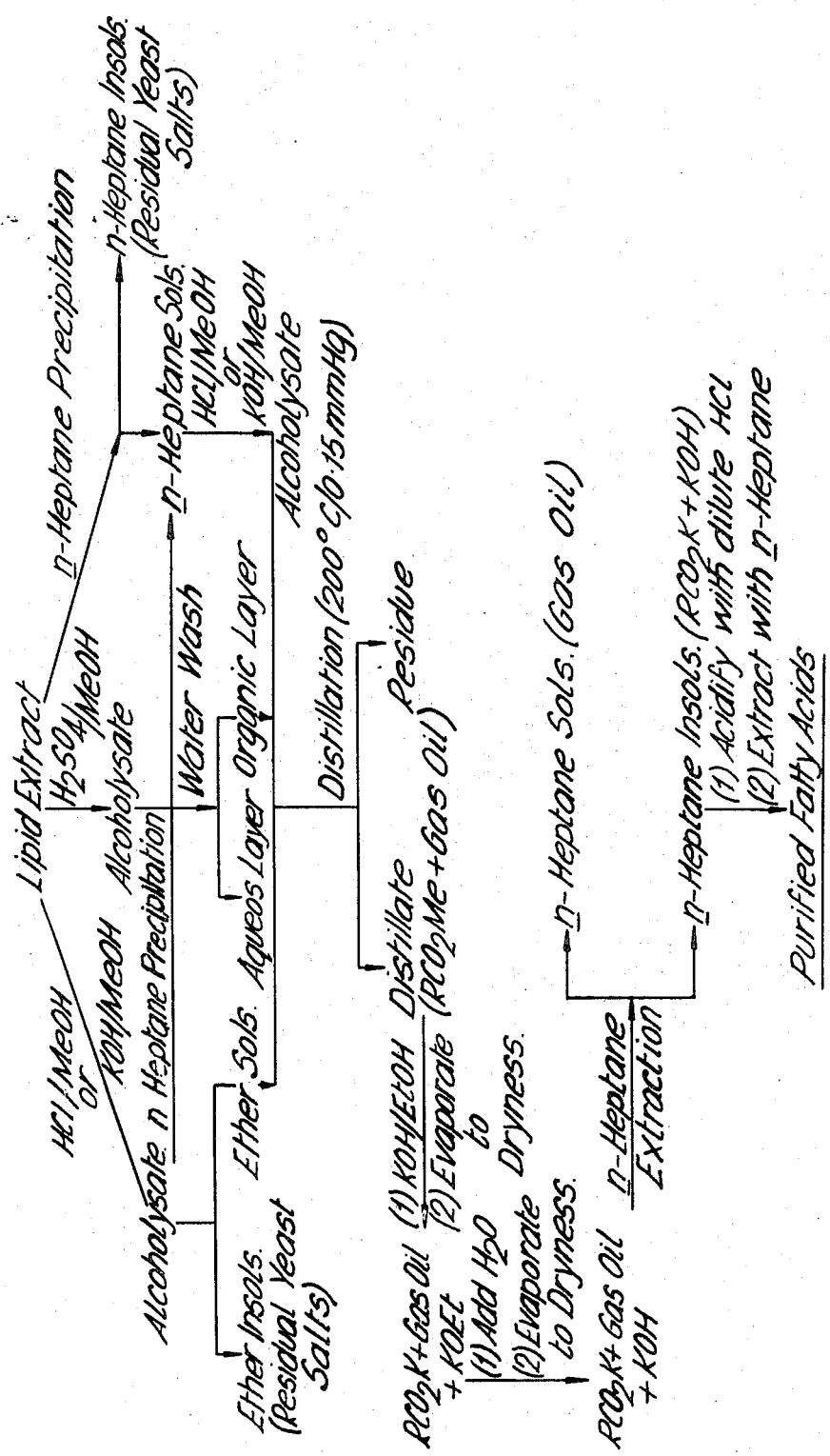

3,642,844
METHOD OF PREPARING CARBOXYLIC ACIDS AND THEIR ESTERS FROM LIPID EXTRACTS
Alan David Forbes, Hampton Wick, Surrey, England, assignor to The British Petroleum Company Limited, London, England
Filed Aug. 6, 1969, Ser. No. 847,942
Claims priority, application Great Britain, Aug. 30, 1968, 41,539/68
Int. Cl. C11c 1/04, 3/04
U.S. Cl. 260—410.9 R 7 Claims

ABSTRACT OF THE DISCLOSURE

Fatty acids can be prepared from the lipid extracts obtained by the solvent extraction of the yeast grown on a hydrocarbon substrate by separating the esters of the fatty acids contaminated with hydrocarbon from the rest of the lipid extract; saponifying the esters, solvent extracting the hydrocarbons and hydrolysing the saponified esters.

---

This invention relates to the preparation and separation of organic acids and esters from complex organic mixtures.

It is known that it is possible to grow micro-organisms from hydrocarbons by cultivation of micro-organism cultures on a hydrocarbon substrate in the presence of nutrient media and oxygen. The recovered organisms may be purified by solvent extraction and the purified micro-organisms are available as a foodstuff. The waste products from the purification stage are a complex mixture of chemicals and are known as lipid extracts. The lipid extracts comprise approximately 10% of the dried culture. Preferably the micro-organisms are yeast.

Hereinafter, by lipid extract is meant that portion of a micro-organism culture grown on a hydrocarbon substrate separated from the micro-organisms by solvent extraction.

It is known that the lipid extracts contain carboxylic acids, especially fatty acids, fatty acids combined in triglycerides, phospho lipids and other compounds. Various attempts have been made to separate these carboxylic acids from the rest of the compounds present, but the methods so far used have not been entirely satisfactory.

The main groups of compounds present in the crude lipid extract are carboxylic acids, residual hydrocarbons from the growth medium, residual micro-organisms, inorganic salts from the nutrient media and a complex group of chemicals containing basically simple lipids, phospholipids, carotenoids and steroids.

Methods relying on conventional hydrolysis techniques tend to be unsatisfactory as organic carboxylic acids are, to some extent, soluble in both aqueous and organic liquid phases, so the presence of carboxylic acid/hydrocarbon mixtures in contact with two phase aqueous/organic solvent systems causes emulsification to take place, preventing separation, particularly in the presence of surface active molecules like phospholipids and residual yeast.

I have now discovered a method of separating carboxylic acids or their esters from mixtures containing hydrocarbons.

The invention provides a method of separating carboxylic acids or their esters from mixtures also containing hydrocarbons which comprises converting the carboxylic acids or their esters into derivatives substantially insoluble in a predetermined solvent for the hydrocarbons, extracting the hydrocarbons with the said solvent and then converting the derivatives of the carboxylic acids or esters back into the carboxylic acids or esters by way of hydrolysis or alcoholysis.

Preferably the carboxylic acids or esters are converted into their alkali metal salts and the solution evaporated to dryness before extraction with the organic solvent. The step of converting the carboxylic acid or esters into their alkali metal salts is hereinafter referred to as saponification.

The carboxylic acids can be recovered from the residue left from the extraction step by acid hydrolysis; for example the residue can be dissolved in water and the solution acidified to precipitate the carboxylic acids. The carboxylic acids can then be separated by a further extraction step.

The residue remaining after the evaporation of the liquid from the saponified mixture can be treated with excess water and the liquids evaporated off again before the residue is extracted with the organic solvent.

The saponification can take place using any conventional reagent but preferably an alkali metal hydroxide dissolved in an alcohol is used. The preferred alcohols are ethanol and methanol. When an alkali metal hydroxide is used the organic acid is finally separated as an alkali metal salt which is substantially insoluble in hydrocarbons. The preferred alkali metals are sodium and potassium.

On account of the solubility of hydrocarbons and the insolubility of ionic salts in hydrocarbon solvents, the organic solvent used is preferably a hydrocarbon, more preferably a paraffin.

The presence of alkali metal alkoxides can apparently influence the solubility of alkali metal carboxylates in hydrocarbon solvents so it is sometimes necessary, in the process, to convert the excess of alkoxide left unreacted after the saponification step to the hydroxide in order to achieve efficient separations.

The present invention is especially useful for the separation of carboxylic acids from lipid extracts.

In order to separate the lipid extract from the micro-organisms, a solvent system consisting of a polar and non-polar solvent may be used. Preferably the polar solvent contains a hydroxyl group. Suitable solvent systems are ethanol/diethyl-ether, methanol/chloroform, and isopropanol/n-hexane, especially useful solvent systems are azeotropic mixtures of alcohols and hydrocarbons. Solvent systems consisting of alcohol/water mixtures are also useful, and the preferred solvent system is an azeotropic isopropanol/water system. The extraction may be carried out at room temperature.

Diethyl-ether may be used as a sole extractant but careful temperature control is required for efficient separation.

After the initial extraction of the lipid extract the solvents used can be evaporated off. When water is present in the solvent system an aqueous mixture is left which is then distilled to remove the water.

The separation of the acids from the bulk of the lipids is preferably carried out after forming esters of the acids. The esters can be formed using any of the conventional techniques and acidic or basic alcoholysis are the preferred methods used. The alcohol used should have four or less carbon atoms and methanol is the most preferred alcohol. A preferred catalyst system is methanol containing a small quantity of concentrated sulphuric acid.

Alternatively the inorganic salts and residual micro-organism can be precipitated from the lipid extracts by the use of a suitable solvent, for example a hydrocarbon solvent like a paraffin or alkane such as as n-heptane, before alcoholysis. In this case the esters formed by the alcoholysis and the hydrocarbon can be distilled off without any solvent extraction being necessary.

The esters can be separated from the bulk of the lipid extract by distillation (in the case of alkaline alcoholysis catalysts) or by solvent extraction followed by distillation (in the case of acidic alcoholysis catalysts). In the case of solvent extraction, ether or n-hexane may be used as solvent to extract the esters from the lipid extract followed by removal of the ether or n-hexane and vacuum distillation of the esters. When concentrated sulphuric acid is used as catalyst, a water wash is carried out at the end of the alcoholysis, to remove the acid and prevent charring of the product during distillation.

The carboxylic esters can be separated from the hydrocarbons and any other compounds present by the method of the present invention as previously described.

The hydrocarbons in which the yeast culture is grown are preferably petroleum fractions which can be obtained directly from crude oil. Preferably $C_{10}$ or higher straight chain hydrocarbons are present in, or constitute the hydrocarbon in which the microorganisms are grown, and preferably the hydrocarbon contains from 10–15% of straight chain paraffins, Suitable methods for growing yeast cultures are described in U.S. Pats. 3,193,390; 3,257,289; 3,268,419; 3,264,196; and U.S. patent applications 408,677; 755,019.

The yeasts in this specification are classified according to the classification system outlined in "The Yeasts, a Taxonomic Study." by J. Lodder and W. J. Kreger-Van Rij, published by North Holland Publishing Co. (Amsterdam) (1952).

Preferably when a yeast is employed this is of the family Cryptococcaceae and particularly of the sub-family Cryptococcoideae however, if desired there may be used, for example, ascosporogeneous yeasts of the sub-family Saccharomycoideae. Preferred genera of the Cryptococcoideae sub-family are Torulopsis (also known as Torula) and Candida. Preferred species of yeast are as follows. In particular it is preferred to use the specific stock of indicated Baarn reference number; these reference numbers refer to CBS stock held by the Centraal Bureau vor Schimmelculture, Baarn, Holland and to INRA stock held by the Institut National de la Recherche Agronomique, Paris, France.

*Candida lipolytica*
*Candida pulcherrima* CBS 610
*Candida utilis*
*Candida utilis, variati major* CBS 841
*Candida tropicalis* CBS 2317
*Torulopsis colliculosa* CBS 133
*Hansenula anomala* CBS 110
*Oidium lactis*
*Neurospora sitophila*
*Mycoderma cancoillote* INRA: STV 11

Of the above *Candida lipolytica* is particularly preferred.

If desired the micro-organism may be a mould. Suitable moulds are Penicillium and preferably there is used *Penicillium expansum*. Another suitable genus is Aspergillus.

If desired the micro-organism may be a bacterium.

Suitably the bacteria are of one of the orders: Pseudomonadales, Eubacteriales and Actinomycetales.

Preferably the bacteria which are employed are of the families Corynebacteriaceae, Micrococcaceae, Achromobacteraceae, Actincymycetaoeae, Rhizobiaceae, Bacillaceae and Pseudomonadaceae. Preferred species are *Bacillus megaterium, Bacillus subtilis* and *Pseudomonas aeruginosa*. Other species which may be employed include:

Bacillus amylobacter
Pseudomonas natriegens
Arthrobacter sp.
Micrococcus sp.
Corynebacterium sp.
*Pseudomonas syringae*
*Xanthomonas begoniae*
*Flavobacterium devorans*
Acetobacter sp.
Actinomyces sp.
*Nocardia opaca*

It will usually be possible to separate the micro-organism, contaminated with some unmetabolised feedstock and aqueous nutrient medium, from the bulk of the unmetabolised feedstock fraction. Preferably the separation is achieved by means of a decantation; additionally or alternatively centrifuging may be used.

The preferred hydrocarbons in which the micro-organism is grown are the hydrocarbons present in gas oil fractions obtained from crude petroleum or normal paraffins. As gas oils generally distil in the temperature range 225–400° C. and the boiling point of carboxylic acids such as myristic acid (250° C./100 mm. Hg), palmitic acid (340–350° C.) and stearic acid (383° C.) falls within this range, simple distillation is not always effective in separating the fatty acids from residual gas oils in the lipid extract. The lipid extract is also liable to contain surface active materials which cause emulsions to form in oil/water mixtures.

When the hydrocarbon in which the micro-organism are grown is a gas-oil then the acids obtained are mainly fatty acids in the $C_{14}$–$C_{18}$ range.

The accompanying chart illustrates schematically alternative separation schemes.

The invention will now be described with reference to the examples.

Example 1 describes the preparation of the lipid extract TL9 and Examples 2–12 describe the separation of the acids therefrom.

EXAMPLE 1

A yeast of the speci *Candida tropicalis* was grown in a gas oil of boiling range 300° C. to 400° C. in the presence of a nutrient medium containing nitrogen and phosphorus. During the growth period air was blown through the liquid mixture.

When the growth had reached the desired stage as measured by the cellular density of the yeast the mixture was centrifuged. A pasty phase containing yeast cells impregnated with hydrocarbons and aqueous medium was thus separated. This pasty phase was washed with water to remove the bulk of the gas oil, and the product obtained heated to 80–90° C. in a rapid current of air and ground to a powder.

The powder was treated by solvent extraction using a mixture of isopropanol, n-hexane and water. The solids not removed by the extracting liquids are the purified food-yeasts and the extracting liquids contain the yeast lipids extract. The extracting liquids are subjected to distillation and all the solvent removed, prior to settling, to give a total yeast lipid extract, TL9.

EXAMPLE 2

Lipid extract TL9, (100 g.), was heated under reflux with 4 N hydrochloric acid (200 ml.) and methanol (200 ml.) for 24 hours under nitrogen. Methanol and hydrochloric acid were removed by distillation at 90° C./15 mm. Hg and the residual material was extracted for 24 hours with ether to remove all ether soluble materials (80 g.). Part (30 g.) of the ether containing ether soluble material was subjected to vacuum distillation and material boiling up to 170° C./0.15 mm. Hg was collected in a number of fractions—the pot temperature did not exceed 220° C. The first fraction was discarded and the other samples containing the methyl esters plus some gas oil were bulked (18 g.). The bulked materials (18 g.) were heated under reflux with ethanolic potassium hydroxide (16 g. KOH/200 ml. ethanol) for 45 minutes. The quantity of potassium hydroxide used represents an excess of about 3 mols (mol ratio KOH:ester=4:1). Ethanol was removed by distillation (75° C./15 mm. Hg) and water (20 ml.) added to decompose residual potassium ethoxide. The water was distilled off (75° C./15 mm. Hg) to leave a solid residue comprising a mixture of potassium hydroxide, gas oil and the potassium salts of the fatty acids. The gas oil was removed by cold extraction with n-heptane and the remaining solids were dissolved in water and acidified with 2 N hydrochloric acid to precipitate the fatty acids which were recovered by extraction with n-heptane. A yield of 11.4 g. acids (represents 31 g. acids/ 100 g. lipids) was obtained. The acids, a yellow semi-liquid wax, had a neutralization number of 204 mg. KOH/g.

EXAMPLE 3

Lipid extract TL9, (258 g.), was dissolved in n-heptane (2000 ml.) and the solution filtered to yield TL9 31 (232 g.) freed from residual yeast and mineral salts. TL9 31 (100 g.) was heated under reflux with 4 N hydrochloric acid (200 ml.) and methanol (200 ml.) for 24 hours under nitrogen. Methanol and dilute hydrochloric acid were removed by distillation at 90° C./15 mm. Hg and the residual material was vacuum-distilled and two fractions, the first (14.4 g.) boiling over the range 86°–160° C./ 0.15 mm. Hg and the second (47.3 g.) boiling over the range 160°–168° C./0.15 mm. Hg were collected. The bulk of the second fraction (44 g.) was treated as in Example 2 to yield 28 g. purified fatty acids, neutralization number=196 mg. KOH/g. This represents a yield of approximately 30 g. acids/100 g. crude lipids.

EXAMPLE 4

Solids-free lipid extract TL9 31 (100 g.) (TL9 31 was obtained by n-heptane precipitation of the crude lipids TL9 as in Example 3) was heated under reflux with methanol (400 ml.) containing a catalytic quantity of potassium hydroxide (1 g.) for 72 hours under nitrogen. Methanol was removed by distillation at 90° C./15 mm. Hg and the residual material was vacuum distilled and two fractions, the first (8.5 g.) boiling up to 144° C./0.20 mm. Hg and the second (56.3 g.) boiling over the range 144°–180° C./0.20 mm. Hg were collected. The bulk of the second fraction (48.6 g.) was treated as in Example 2 to yield (31.6 g.) purified fatty acids, neutralization number=180 mg. KOH/g. This represents a yield of 36 g. acids/100 g. crude lipids.

EXAMPLE 5

Lipid extract TL9 (108 g.) was heated under reflux with methanol (400 ml.) and concentrated sulphuric acid (5 ml.) for 24 hours under nitrogen. The crude alcoholysate was washed with water (200 ml.) and the organic layer was separated and heated at 90° C./15 mm. Hg to remove water and methanol. The residual material was vacuum distilled and two fractions, the first (1.0 g.) boiling over the range 98°–124° C./0.3 mm. Hg and the second (72.8 g.) boiling over the range 124°–186° C./0.5 mm. Hg were collected. The second fraction (72.0 g.) was heated under reflux with ethanolic potassium hydroxide (26 g./150 ml. ethanol) for 45 minutes. An excess of about 150 percent weight potassium hydroxide was used. The products were treated thereafter as in Example 2. Purified fatty acids (43.1 g.) of neutralization number 203 mg. KOH/g. were obtained. This represents a yield of approximately 40 g. acids/100 g. crude lipids.

The acids obtained in the above examples are mainly in the $C_{14}$–$C_{18}$ range and comprise a mixture of saturated and unsaturated types. The main component is heptadecen-9-oic acid (approximately 40%). The acids can be isolated by chromatography or any other suitable method, but for some uses the mixture is suitable.

EXAMPLE 6

Lipid extract TL9 (499 g.) was heated under reflux with methanol (2:1) and concentrated sulphuric acid (25 ml.) for 24 hours under nitrogen. The crude alcoholysate was washed with water (1 litre) and the organic layer was separated and heated at 90° C./15 mm. Hg to remove water and methanol. The residual material was vacuum distilled and two fractions, the first (0.7 g.) boiling over the range 105°–120° C./0.05 mm. Hg and the second (308 g.), boiling over the range 120°–180° C./ 0.05 mm. Hg, were collected.

Part of the second fraction (55.3 g.) was treated as in Example 2 to give purified fatty acids (40.8 g.) of neutralization number 187 mg. KOH/g. This represents a yield of 46 g. fatty acids/100 g. crude lipids.

EXAMPLE 7

Part of the second fraction (55.1 g.) from Example 6 was heated under reflux with potassium hydroxide (18 g., 100 percent molar excess) in methanol (130 ml.) for 45 minutes. Methanol was removed by distillation (75° C./15 mm. Hg) and the residue was thoroughly extracted with n-heptane to remove the gas oil and the remaining solids were dissolved in water and acidified with 2 N hydrochloric acid to precipitate the fatty acids which were recovered by extraction with n-heptane. A yield of 39 g. acids/100 g. crude lipids was obtained; the acids had a neutralization number of 211 mg. KOH/g.

EXAMPLE 8

Part of the second fraction (55.8 g.) for Example 6 above, was heated under reflux with sodium hydroxide (16 g., 100 percent molar excess) in ethanol (130 ml.) for 1 hour. After removal of the ethanol by distillation (90° C./15 mm. Hg) the residual materials were subjected to the same procedure as outlined in Example 2 to yield purified fatty acids (40.3 g.) of neutralization number, 197 mg. KOH/g. This represents a yield of 45 g. acids/100 g. crude lipids.

EXAMPLE 9

Part of the second fraction (54.9 g.) from Example 6 above, was heated under reflux with sodium hydroxide (16 g. 100 percent molar excess) in methanol (140 ml.) for 1 hour. Methanol was removed by distillation (75° C./15 mm. Hg) and the residue was thoroughly extracted with n-heptane (8× 300 ml.) to remove the gas oil. The remaining solids were dissolved in water and acidified with 2 N hydrochloric acid to precipitate the fatty acids which were then recovered by extraction with n-heptane. A yield of 38 g. acids/100 g. crude lipids was obtained, neutralization number 207 mg. KOH/g.

EXAMPLE 10

Part of the second fraction (55.2 g.), from Example 6 above, was heated under reflux with sodium hydroxide (8.8 g., 10 percent molar excess) in methanol (130 ml.) for 1 hour. The sample thereafter was treated as in Example 9 above to yield 38 g. acids/100 g. crude lipids of neutralisation number 194 mg. KOH/g.

EXAMPLE 11

Lipids extract, TL26 VR, (527 g.) (TL26 VR was prepared in substantially the same way as TL9 in Example 1 except that the solvent used to extract the crude lipids was an isopropanol/water azeotrope) and toluene (525 g.) were heated under reflux for 6 hours to remove any water present in the lipids; about 8 ml. were collected in a Dean and Stark side-arm. A solution of potassium hydroxide (33 g.) in dried methanol (196 g.) was added and the flask contents were heated under reflux for about one hour and allowed to stand. The reaction mixture separated into an upper and lower phase which were separated by decantation; the upper phase contained the methyl fatty acid esters and gas oil mainly. This material (439 g.) was stripped of solvents (80° C./20 mm. Hg) and vacuum distilled to give two fractions, the first (1.0 g.) boiling up to 132°/0.1 mm. Hg and the second (309 g.) boiling over the range 132°–182°/0.10 mm. Hg. The second distillate fraction contained a lower immiscible layer amounting to several grammes only; this was discarded. The remainder of the second distillate fraction in n-heptane (300 ml.) was filtered through a charcoal bed to yield, after solvent removal (90° C./15 mm. Hg), a clear water-white liquid (278 g.), comprising a mixture of methyl esters of fatty acids and gas oil. This mixture had a saponification value of 178 mm. KOH/g.; therefore it contains about 85 percent weight methyl esters and 15 percent weight gas oil. A yield of about 53 g./100 g. crude lipids of this ester/gas oil mixture was obtained.

A portion (95.7 g.) of this mixture was treated as in Example 8 to yield purified fatty acids (70.2 g.), of neutralization number 217 mg. KOH/g. This represents a yield of 41 g. acids/100 g. crude lipids. The acids were water-white in colour when fluid.

EXAMPLE 12

Lipid extract, TL26 VR (504 g.), was heated under reflux with methanol (1800 ml.) and concentrated sulphuric acid (50 ml.) under nitrogen for 20 hours. The crude alcoholysate was washed with water (1 litre) and the organic layer was separated and heated at 90° C./ 0.10 mm. Hg was collected. This distillate in n-heptane (300 ml.) was filtered through a bed of activated charcoal to yield after solvent removal (90° C./15 mm. Hg) an almost water-white liquid (305.1 g.). This represents a yield of 61 g./100 g. crude lipids of a methyl fatty acid ester/gas oil mixture.

A portion (99.5 g.) of this mixture was treated as in Example 8 to yield purified fatty acids (76.7 g.), of neutralisation number, 204 mg. KOH/g. This represents a yield of 47 g. acids/100 g. crude lipids. The acids were a very pale yellow in colour.

I claim:
1. A method of preparing compounds selected from the group consisting of carboxylic acids and esters of said acids from the lipid extract obtained by the growth of yeast micro-organisms on a hydrocarbon substrate which comprises:
   (i) reacting compounds selected from the group consisting of carboxylic acids and esters of said acids in the lipid extract with a $C_{1-4}$ alcohol to convert said compounds to their $C_{1-4}$ esters and removing said $C_{1-4}$ esters mixed with some hydrocarbons from the hydrocarbon substrate from the rest of the lipid extract;
   (ii) reacting the removed mixture of $C_{1-4}$ esters and hydrocarbons from the hydrocarbon substrate with an alkali metal hydroxide to form alkali metal salts of the carboxylic acid components provided by the treated $C_{1-4}$ esters;
   (iii) removing the said hydrocarbons from the hydrocarbon substrate from said alkali metal salts by extraction with a hydrocarbon solvent which is a solvent for said hydrocarbons and in which said alkali metal salts of carboxylic acid are substantially insoluble; and
   (iv) treating said alkali metal salts of carboxylic acids to a conversion step to form compounds selected from the group consisting of the free carboxylic acids and esters of carboxylic acids, said conversion step being a hydrolysis step when the alkali metal salts of carboxylic acids are converted to the free carboxylic acids and an alcoholysis step when the alkali metal salts of carboxylic acids are converted to esters of carboxylic acid.

2. A method according to claim 1 wherein in step (iii) the hydrocarbon solvent for the hydrocarbons mixed with the $C_{1-4}$ esters is a paraffin.

3. A method according to claim 1 in which in step (i) the reaction of said compounds with a $C_{1-4}$ alcohol to form $C_{1-4}$ esters is carried out in the presence of a catalyst selected from the group consisting of mineral acids and alkali metal hydroxides and wherein the $C_{1-4}$ esters mixed with hydrocarbons from the hydrocarbon substrate are separated from the rest of the lipid extract by distillation.

4. A method of preparing compounds selected from the group consisting of carboxylic acids and esters of said acids from the lipid extract obtained by the growth of yeast micro-organisms on a hydrocarbon substrate which comprises:
   (i) extracting the lipid extract with a solvent which is a paraffin to obtain a solvent extract containing (1) compounds selected from the group consisting of carboxylic acids and esters of said acids and (2) some hydrocarbons from the hydrocarbon substrate, treating the solvent extract with a $C_{1-4}$ alcohol containing a catalytic amount of an alkali metal hydroxide to convert said compounds to their $C_{1-4}$ esters and distilling off the mixture of the $C_{1-4}$ esters and hydrocarbons from the hydrocarbon substrate;
   (ii) reacting the removed mixture of $C_{1-4}$ esters and hydrocarbons from the hydrocarbon substrate with an alkali metal hydroxide to form alkali metal salts of the carboxylic acid components provided by the treated $C_{1-4}$ esters;
   (iii) removing the said hydrocarbons from the hydrocarbon substrate from said alkali metal salts by extraction with a hydrocarbon solvent which is a solvent for said hydrocarbons and in which said alkali metal salts of carboxylic acid are substantially insoluble; and
   (iv) treating said alkali metal salts of carboxylic acids to a conversion step to form compounds selected from the group consisting of the free carboxylic acids and esters of carboxylic acids, said conversion step being a hydrolysis step when the alkali metal salts of carboxylic acids are converted to the free carboxylic acids and an alcoholysis step when the alkali metal salts of carboxylic acids are converted to esters of carboxylic acid.

5. A method of extracting fatty acids from the lipid extract obtained by the growth of a yeast on a hydrocarbon substrate by:
   (i) extracting the yeast with a solvent selected from alcohol/alkane/water and alcohol/water mixtures to leave a residue of lipid extract,
   (ii) extracting the lipid extract with a paraffin to extract the fatty acids and their esters mixed with some substrate hydrocarbon,
   (iii) converting the fatty acids and their esters in the extracted lipid extract into the esters of a $C_{1-4}$ alcohol by alcoholysis using a catalyst selected from mineral acids and alkali metal hydroxides,
   (iv) distilling off the said paraffin extractant to leave the said esters of the fatty acids and a $C_{1-4}$ alcohol mixed with the said hydrocarbon from the substrate,
   (v) saponifying the said fatty acid esters obtained with a saponification agent selected from alcohol solutions of alkali metal hydroxides and alkali metal alkoxides,
   (vi) removing the said saponified fatty acid ester from the said hydrocarbon of the substrate by extraction with a hydrocarbon solvent for the said hydrocarbon in which the said saponified fatty acid ester is insoluble and,
   (vii) hydrolysing the said saponified fatty acid ester to form the free fatty acid.

6. A method as claimed in claim 5 in which after the said saponification of the said fatty acid esters of a $C_{1-4}$ alcohol any unreacted alkali metal alkoxide is hydrolysed to alkali metal hydroxide before removal of the said saponified fatty acid.

7. A method of preparing fatty acids from yeasts grown on a hydrocarbon substrate by:
   (i) extracting the yeast with a solvent selected from an alcohol/water/paraffin mixture and an alcohol/water azeotrope to leave a lipid extract residue.
   (ii) converting the fatty acid containing substances in the lipid extract into their methyl esters by reaction with methanol and a catalytic amount of sulphuric acid,
(iii) distilling off the methyl esters of the fatty acids contaminated with the said hydrocarbon substrate,
(iv) saponifying the said methyl esters by reaction with sodium hydroxide dissolved in methanol to form the sodium salts of the fatty acids,
(v) dehydrating the said saponification reaction mixture and extracting the dehydrated product with a paraffin to leave a residue of the sodium salts of the fatty acids,
(vi) hydrolysing the said salts of the fatty acids to liberate the fatty acids.

References Cited

UNITED STATES PATENTS

| | | | |
|---|---|---|---|
| 2,506,473 | 5/1950 | Steinberger | 260—638 |
| 2,617,814 | 11/1952 | Guillemonat | 260—410.9 |
| 3,354,047 | 11/1967 | Hitzman | 195—28 |

LEWIS GOTTS, Primary Examiner

E. G. LOVE, Assistant Examiner

U.S. Cl. X.R.

260—412.8, 418